United States Patent
Ichikawa et al.

(10) Patent No.: US 11,855,493 B2
(45) Date of Patent: Dec. 26, 2023

(54) ELECTRIC POWER STEERING DEVICE

(71) Applicant: Mitsubishi Electric Corporation, Tokyo (JP)

(72) Inventors: Takanori Ichikawa, Tokyo (JP); Takashi Yagihara, Tokyo (JP); Yu Kawano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 201 days.

(21) Appl. No.: 16/982,779

(22) PCT Filed: Apr. 20, 2018

(86) PCT No.: PCT/JP2018/016283
§ 371 (c)(1),
(2) Date: Sep. 21, 2020

(87) PCT Pub. No.: WO2019/202730
PCT Pub. Date: Oct. 24, 2019

(65) Prior Publication Data
US 2021/0006134 A1 Jan. 7, 2021

(51) Int. Cl.
*H02K 11/01* (2016.01)
*H02K 11/33* (2016.01)
(Continued)

(52) U.S. Cl.
CPC ......... *H02K 11/0141* (2020.08); *B62D 5/046* (2013.01); *H02K 9/227* (2021.01);
(Continued)

(58) Field of Classification Search
CPC .... H02K 11/0141; H02K 11/33; H02K 11/40; H02K 9/227; H02P 27/08; H02P 29/40;
(Continued)

(56) References Cited

U.S. PATENT DOCUMENTS 5,500,789 A * 3/1996 Miller .................. H05K 9/0039
174/355
8,348,008 B2 * 1/2013 Yamaguchi .......... B62D 5/0409
310/71
(Continued)

FOREIGN PATENT DOCUMENTS

WO 2015/049791 A1 4/2015
WO WO-2016166796 A1 * 10/2016 ........... B62D 5/0406

OTHER PUBLICATIONS

WO-2016075789-A1 (Year: 2016).*
(Continued)

*Primary Examiner* — Tulsidas C Patel
*Assistant Examiner* — Joshua Kiel M Rodriguez
(74) *Attorney, Agent, or Firm* — Sughrue Mion, PLLC; Richard C. Turner

(57) ABSTRACT

The electric power steering device includes a motor and a control unit integrated coaxially therewith at an output shaft end of the motor. The motor has two sets of windings independently of each other. The control unit includes two inverter circuits having a plurality of switching elements for supplying currents, and two control circuits for respectively outputting drive signals to the inverter circuits. The inverter circuits are formed by power modules, and have detection terminals for detecting voltages between both ends of shunt resistors for detecting currents. Shield walls for shielding noise are provided to a heatsink for supporting the power modules and control boards forming the control circuits. The shield walls support the control boards.

8 Claims, 8 Drawing Sheets

(51) Int. Cl.
  *H02K 11/40*   (2016.01)
  *B62D 5/04*    (2006.01)
  *H02K 9/22*    (2006.01)
  *H02P 25/22*   (2006.01)
  *H02P 29/40*   (2016.01)
  *H02P 27/06*   (2006.01)

(52) U.S. Cl.
  CPC ............. *H02K 11/33* (2016.01); *H02K 11/40* (2016.01); *H02P 25/22* (2013.01); *H02P 27/06* (2013.01); *H02P 29/40* (2016.02)

(58) Field of Classification Search
  CPC .. H02P 25/22; H02P 27/06; H02P 5/74; H02P 25/03; H03B 2200/0088; B62D 5/046; B62D 5/0406
  See application file for complete search history.

(56) References Cited

U.S. PATENT DOCUMENTS

| | | | | |
|---|---|---|---|---|
| 8,471,418 | B2* | 6/2013 | Yamasaki | H02K 11/33 310/71 |
| 2011/0211980 | A1* | 9/2011 | Shibuya | H05K 7/1432 417/410.1 |
| 2011/0254388 | A1 | 10/2011 | Yamasaki | |
| 2012/0098366 | A1* | 4/2012 | Yamasaki | H02K 3/50 310/72 |
| 2012/0160596 | A1 | 6/2012 | Yamasaki | |
| 2014/0063747 | A1* | 3/2014 | Sotome | H05K 7/209 361/720 |
| 2016/0174393 | A1 | 6/2016 | Asao et al. | |
| 2016/0254732 | A1* | 9/2016 | Kojima | B62D 5/0406 310/68 R |

OTHER PUBLICATIONS

International Search Report for PCT/JP2018/016283 dated Jul. 10, 2018 [PCT/ISA/210].
Communication dated Mar. 1, 2021, from the European Patent Office in application No. 18915607.8.
Office Action dated Mar. 11, 2022 in European Application No. 18915607.8.
Office Action dated Sep. 23, 2022 issued by the Chinese Patent Office in Chinese Application No. 201880092399.7.
Office Action dated Feb. 23, 2023 in Chinese Application No. 201880092399.7.
Communication dated May 9, 2023 issued by the State Intellectual Property Office of the P.R.China in application No. 201880092399.7.

* cited by examiner

ELECTRIC POWER STEERING DEVICE

CROSS REFERENCE TO RELATED APPLICATIONS

This application is a National Stage of International Application No. PCT/JP2018/016283 filed Apr. 20, 2018.

TECHNICAL FIELD

The present disclosure relates to measures for noise of a control unit including two sets of motor windings and motor drive circuits in an electric power steering device in which a motor and the control unit are integrated.

BACKGROUND ART

Some of conventional electric power steering devices in which a motor and a control unit arranged coaxially in the axial direction of the output shaft of the motor are integrated, have a structure in which the control unit arranged near the motor having a stator, a rotor, and the like in a motor case is assembled with its major components stacked in the axial direction. In addition, considering redundancy, in some conventional devices, two sets of motor windings are provided and so-called inverter circuits and control boards for driving these motor windings are also provided for two sets independently of each other (see, for example, Patent Document 1).

CITATION LIST

Patent Document

Patent Document 1: WO2015/049791

SUMMARY OF THE INVENTION

Problems to be Solved by the Invention

In the conventional device disclosed in Patent Document 1, the control unit is provided on the side opposite to the output shaft of the motor, and a plurality of connectors and components of a power supply circuit portion 20 are provided at a connector case 3 covering a control unit 4. Thus, the power supply circuit portion 20 which is a comparatively large component is not provided in the control unit 4 but is provided separately therefrom, to achieve size reduction. The components (capacitors and coils) of the power supply circuit portion 20 are connected to power supply conduction bars 13, 14, 15a to 15c extending from a power supply connector 1, thus exhibiting some effect for the power supply circuit portion 20 to discharge noise to outside of the device.

However, in recent years, control units for performing PWM driving with large current are provided for two sets, and thus the noise sources are increased, and further, a circuit for detecting minute current is provided. Therefore, there is room for improvement in noise measures.

The present disclosure has been made to solve the above problem, and an object of the present disclosure is to provide an electric power steering device having improved noise measures.

Solution to the Problems

An electric power steering device according to the present disclosure includes: a motor having two sets of windings provided independently of each other; and a control unit including two inverter circuits respectively supplying currents to the two sets of windings and each composed of a plurality of switching elements, and control circuits respectively connected to the two inverter circuits. The control unit includes a detection circuit for detecting current of each inverter circuit, and a detection terminal extending from the detection circuit. A shield wall made of metal and for shielding noise emitted by driving of one of the two inverter circuits is provided near the detection terminal of the other inverter circuit. At least one of the shield walls has a support member for supporting the control circuit.

Effect of the Invention

In the electric power steering according to the present disclosure, shield walls made of metal are provided near the detection terminals against radiation noise from one of noise sources. Thus, noise can be blocked with a simple structure and accuracy of detection signals can be improved.

DESCRIPTION OF EMBODIMENTS

Embodiment 1

Figure 1:
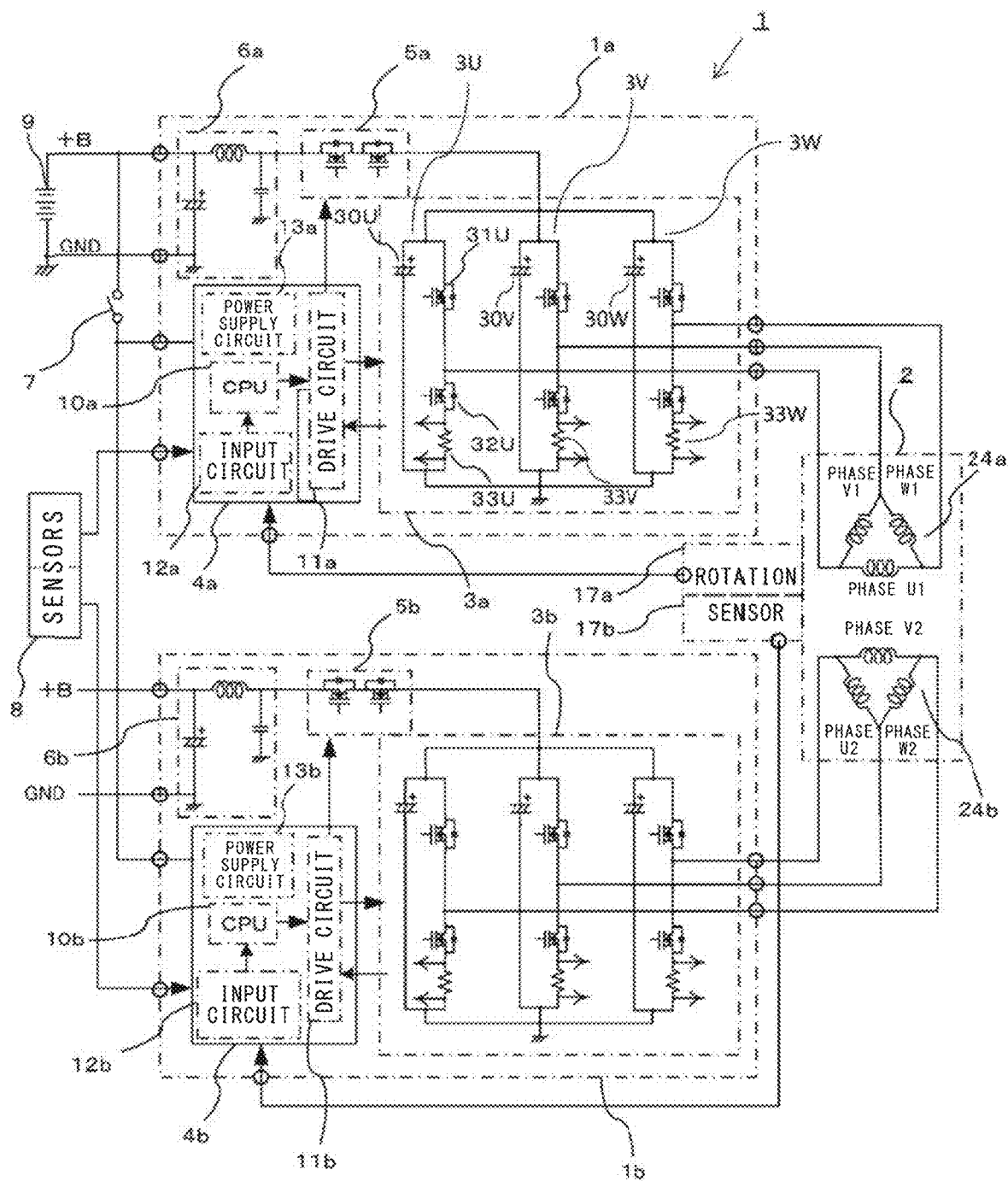
FIG. 1 is a circuit diagram of an electric power steering device according to embodiment 1.
Figure 2:
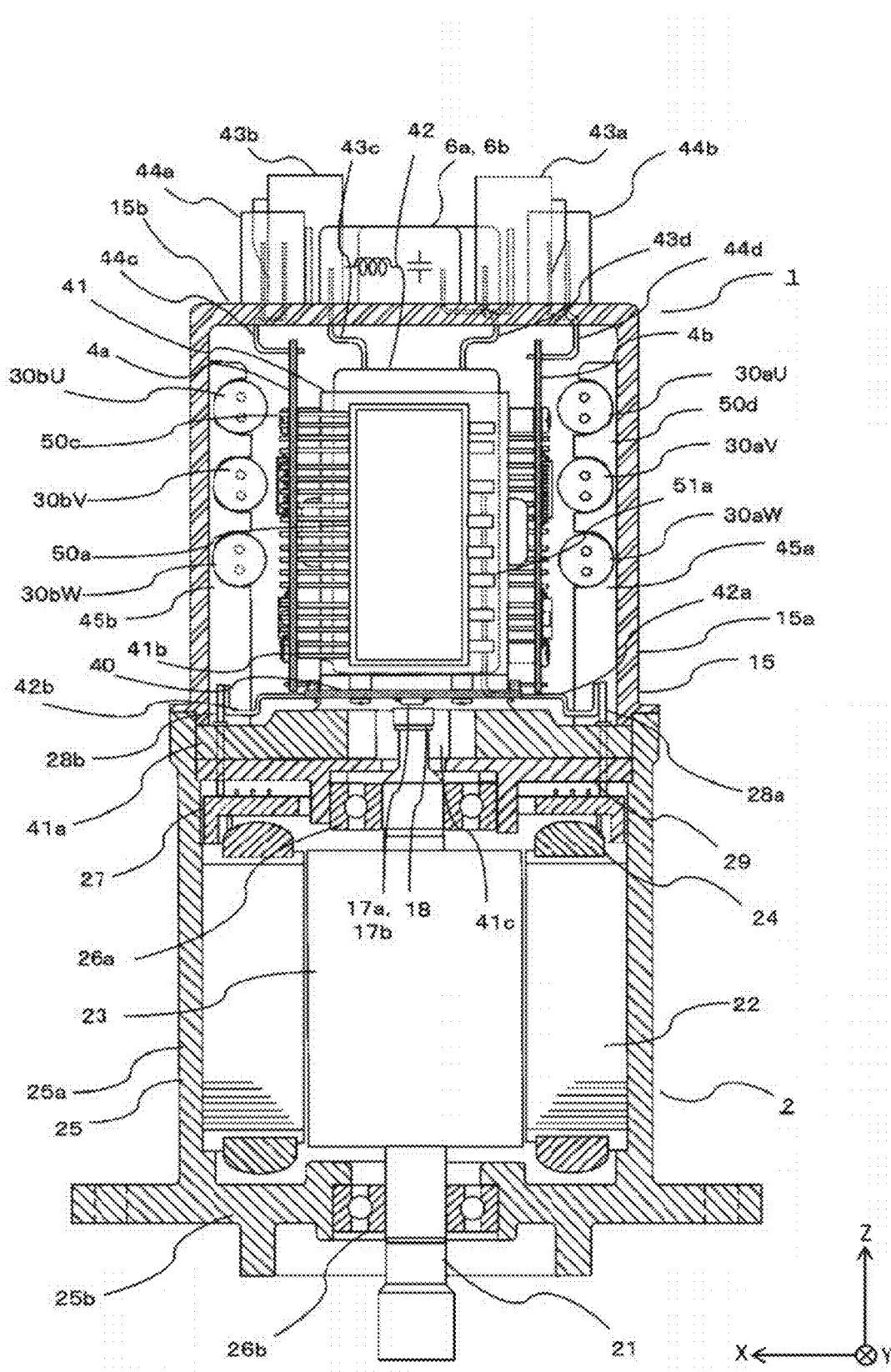
FIG. 2 is a sectional view showing the electric power steering device according to embodiment 1.
Figure 3:
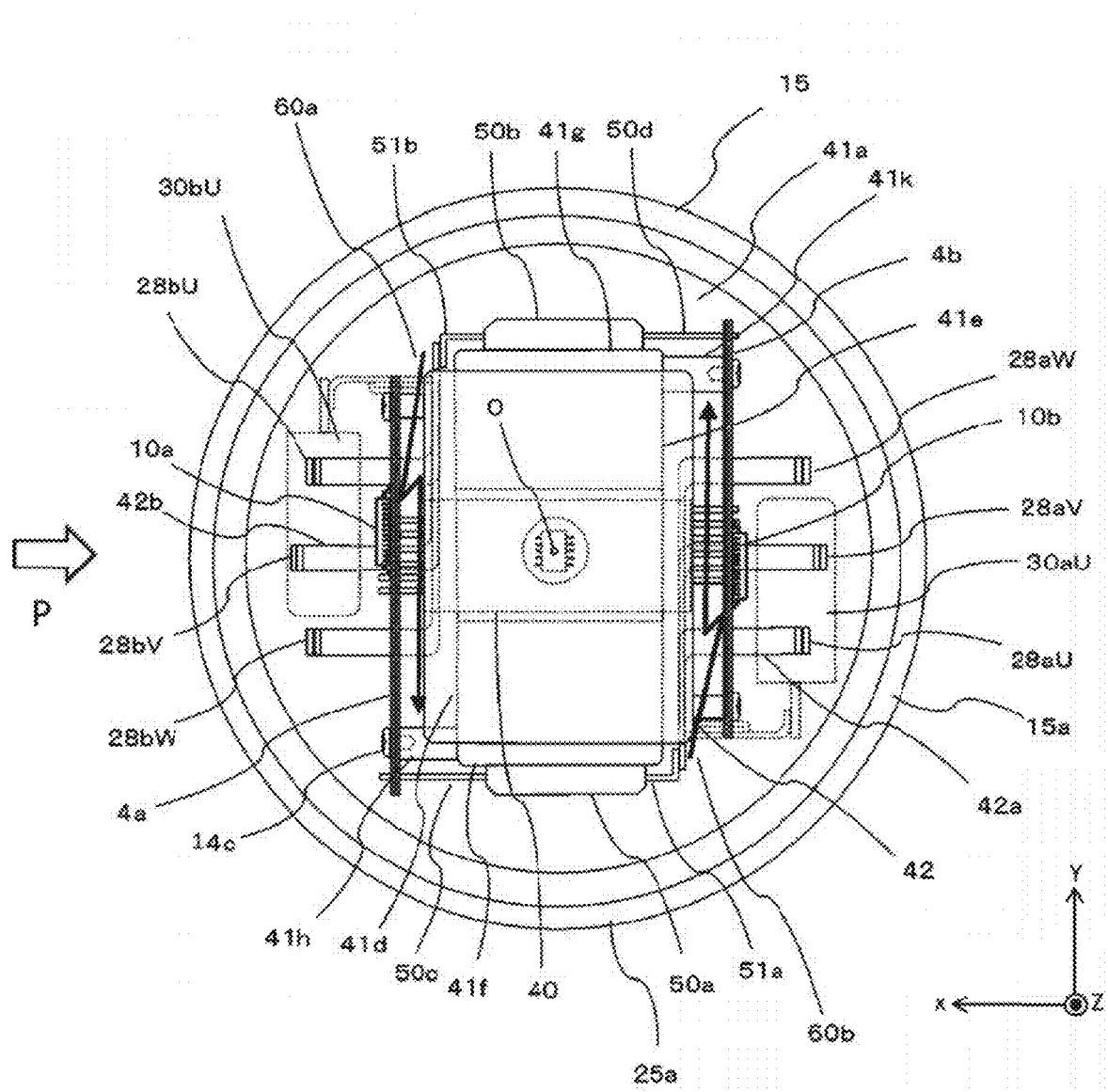
FIG. 3 is a see-through view around a control unit of the electric power steering device according to embodiment 1, as seen from a non-output side.

The entire configuration and operation of an electric power steering device according to embodiment 1 will be described. FIG. 1 is a circuit diagram of the electric power steering device according to embodiment 1, FIG. 2 is a sectional view showing the electric power steering device according to embodiment 1, and FIG. 3 is a see-through view around a control unit of the electric power steering device according to embodiment 1 as seen from a non-output side. In the following description, the same or corresponding members or parts in the drawings are denoted by the same reference characters.

First, control of the electric power steering device will be described with reference to FIG. 1. In FIG. 1, a motor winding 24 includes two sets of three-phase motor windings 24a, 24b. It is noted that the motor winding 24a is a first motor winding and the motor winding 24b is a second motor winding. A control unit 1 includes control units 1a, 1b respectively dedicated for the two sets of motor windings 24a, 24b. The control unit 1a includes a control board 4a which is a first control circuit provided with a CPU 10a, various circuits, and the like, an inverter circuit 3a for supplying current to a motor 2, a power supply relay 5a, a filter 6a, and the like.

Similarly, the control unit 1b includes a control board 4b which is a second control circuit provided with a CPU 10b, various circuits, and the like, an inverter circuit 3b for supplying current to the motor 2, a power supply relay 5b, a filter 6b, and the like.

The circuit configuration of the control unit 1 will be described. The control units 1a, 1b have the same configuration, and therefore, only the control unit 1a will be described here.

Power is supplied to the control unit 1a via an ignition switch 7 from a battery 9 mounted on a vehicle. Information from sensors 8 such as a vehicle speed sensor for detecting a traveling speed of the vehicle and a torque sensor provided near a steering wheel to detect steering torque, is transmitted to the CPU 10a. The CPU 10a calculates a current value which is a control quantity for rotating the motor 2 on the basis of the above information, and outputs the current value to a drive circuit 11a. In response to the output signal from the CPU 10a, the drive circuit 11a outputs drive signals for driving switching elements of the inverter circuit 3a, to the inverter circuit 3a.

In a power supply system (+B power supply line, ground (GND)) connected to the battery 9, the filter 6a formed of a capacitor and a coil is provided for suppressing emission of noise due to PWM driving of the inverter circuit 3a or suppressing power supply variation. Further, the power supply relay 5a for opening/closing the +B power supply line is provided on the +B power supply line. The power supply relay 5a includes two switching elements, and two parasitic diodes directed in the forward direction and the reverse direction with respect to the current supply direction. The power supply relay 5a is capable of forcibly interrupting supply of power in the case where failure has occurred in the inverter circuit 3a or the motor 2, for example. Further, the power supply relay 5a is capable of breaking a line through which current flows, in the case where the battery 9 is reversely connected, and thus also serves for so-called battery reverse connection protection.

The inverter circuit 3a includes three circuit portions 3U, 3V, 3W corresponding to the respective phases of the motor winding 24a. Here, the three circuit portions 3U, 3V, 3W have the same configuration, and therefore only the circuit portion 3U will be described. The circuit portion 3U includes a switching element 31U for upper arm and a switching element 32U for lower arm. The switching elements 31U, 32U for upper and lower arms are subjected to PWM driving on the basis of a command from the CPU 10a. Therefore, for the purpose of suppressing noise and suppressing power supply variation, a smoothing capacitor 30U is connected in parallel to the switching elements 31U, 32U for upper and lower arms. Further, a shunt resistor 33U for detecting current flowing through the motor 2 is connected in series to the switching element 32U for lower arm.

The circuit portions 3U, 3V, 3W have the same circuit configuration with respect to the respective windings for phase U1, phase V1, and phase W1 of the motor winding 24a, and are capable of independently supplying currents to the respective windings. In FIG. 1, circle marks (○) represent connection terminals to external devices, provided in the control units 1a, 1b.

The potential difference between both ends of the shunt resistor 33U, the voltage of a motor winding terminal, and the like are inputted to an input circuit 12a. The shunt resistor 33U corresponds to a detection circuit. Since the shunt resistor 33U is connected in series to the motor current circuit, the resistance value of the shunt resistor 33U is very small and the potential difference between both ends thereof is also small. Therefore, the potential difference is amplified by the drive circuit 11a, to be inputted to the CPU 10a. Accordingly, if noise is mixed into the shunt resistor 33U, the noise is also amplified, and therefore it is necessary to block the noise. The CPU 10a calculates a difference from a detected current value with respect to a calculated current value and performs so-called feedback control, thereby supplying desired motor current to assist steering force. Therefore, in particular, accuracy of the detected current value greatly influences control performance.

Further, drive signals for the switching elements of the power supply relay 5a which acts as a relay for connecting or disconnecting the battery 9 and the inverter circuit 3a are outputted via the drive circuit 11a. Since large current flows through the switching elements of the power supply relay 5a, the switching elements involve heat generation. Therefore, the switching elements of the power supply relay 5a may be incorporated into the inverter circuit 3a so as to be formed as a power module.

The CPU 10a has an abnormality detecting function of detecting abnormality in the sensors 8, the drive circuit 11a, the inverter circuit 3a, the motor winding 24a, or the like from various information inputted. When abnormality is detected, in accordance with the abnormality, the CPU 10a turns off the switching elements for upper and lower arms for the phase in which the abnormality is detected, to interrupt supply of current for only that phase, for example. In addition, the CPU 10a is also capable of turning off the switching elements of the power supply relay 5a to interrupt the power supply itself.

Here, as described above, the motor 2 is a brushless motor having two sets of three-phase motor windings 24a, 24b connected in a delta form. For the brushless motor, a rotation sensor for detecting the rotational position of a rotor 23 is provided. Also for the rotation sensor, two rotation sensors 17a, 17b are provided to ensure redundancy. Rotation information from the rotation sensors 17a, 17b is inputted to the input circuits 12a, 12b of the control boards 4a, 4b, respectively.

While the motor is described as a three-phase motor, the motor may be a multiphase motor with four or more phases. In addition, while the motor winding is configured with three-phase windings connected in a delta form, the three-phase windings may be connected in a star form. In addition, while the motor is described as a three-phase brushless motor, the motor may be a brush-equipped motor with two pairs of two poles. The motor winding may be formed by distributed winding or concentrated winding. The motor may be a so-called tandem motor having two stators. In either case of having only one set of windings or performing cooperation between two sets of windings, it is only required that desired motor rotation speed and torque can be outputted.

As described above, in this electric power steering device, circuit networks, connectors, sensors, and the like are all configured for two sets independently of each other, thus ensuring redundancy.

Next, with reference to FIG. 2, the structure of the electric power steering device will be described. The electric power steering device includes the control unit 1 and the motor 2. The control unit 1 is mounted on one side in the axial direction of an output shaft 21 of the motor 2 coaxially with the motor 2, and is integrated with the motor 2. The electric power steering device is set such that the axial direction of the output shaft 21 of the motor 2 is directed in the up-down direction and the control unit 1 is located on the upper side. Output of the motor 2 is transmitted from the lower end of the output shaft 21 to, for example, a speed reducer (not shown). That is, in FIG. 2, the lower end side of the output shaft 21 (negative direction of Z axis) is the output side, and the upper end side of the output shaft 21 (positive direction of Z axis) is a non-output side.

First, the configuration of the motor 2 will be described. The motor 2 is composed of, mainly, the output shaft 21, the rotor 23, a stator 22, and a motor case 25 storing these.

The motor case 25 is formed in a bottomed cylindrical shape having a cylinder portion 25a and a bottom portion 25b closing an opening on the output side of the cylinder portion 25a. The motor case 25 is made of metal, and is desirably made of aluminum in view of heat dissipation property and the exterior shape. A frame 29 is made of metal and formed in a disk shape. The frame 29 is inserted and retained in an opening on the non-output side of the cylinder portion 25a by press-fit, shrink-fit, or the like, so as to close the opening on the non-output side of the cylinder portion 25a. The frame 29 serves as a cover of the motor 2. The motor 2 is made separate from and independent of the control unit 1 by the frame 29.

The stator 22 is inserted and retained in the cylinder portion 25a of the motor case 25 by press-fit, shrink-fit, or the like. The stator 22 is provided with the three-phase motor winding 24. As described above, the motor winding 24 includes two sets of three-phase motor windings 24a, 24b. An annular wiring portion 27 is provided on the output side of the frame 29 and near the motor winding 24. The terminals of the motor winding 24 are connected to the annular wiring portion 27. Three of each of phase terminals 28a, 28b through which three-phase currents for driving the motor windings 24a, 24b flow are led from the annular wiring portion 27, and penetrate through the frame 29 so as to be led to the non-output side. That is, the three phase terminals 28a are connected to the windings for the respective phases of the motor winding 24a, and the three phase terminals 28b are connected to the windings for the respective phases of the motor winding 24b.

The rotor 23 is fixed to the output shaft 21 and rotatably provided in the motor case 25. The output shaft 21 is supported by a bearing 26a provided at the axis position of the frame 29 and a bearing 26b provided at the axis position of the bottom portion 25b. The rotor 23 is provided in the stator 22 coaxially with the stator 22. A sensor rotor 18 is provided at the protruding end of the output shaft 21 from the frame 29. Although not shown, a plurality of permanent magnets are arranged at a constant pitch on the outer circumferential surface of the rotor 23 or on the inner circumferential side near the outer circumference thereof such that N poles and S poles are alternately arranged in the circumferential direction.

Next, the configuration of the control unit 1 will be described with reference to FIG. 2 and FIG. 3.

In FIG. 2, the control unit 1 needs to be formed such that the area thereof in the radial direction which is a direction (X-axis direction in the drawing) perpendicular to the output shaft 21 is equal to or smaller than that of the motor 2. Accordingly, for attachment of the control unit 1, a vertical-arrangement structure in which major components thereof are arranged in parallel to the output shaft 21 is adopted.

The control unit 1 is covered by a housing 15 made of resin around the outer layer thereof. That is, the housing 15 forms an outer cover of the control unit 1. The housing 15 is formed in a bottomed cylindrical shape having a cylindrical circumferential wall 15a covering components of the control unit 1, and a bottom portion 15b closing an opening on one side of the circumferential wall 15a. The end surface on the non-output side of the bottom portion 15b is a flat surface perpendicular to the axial direction of the output shaft 21. The housing 15 is fitted to the opening of the cylinder portion 25a of the motor case 25 with the opening of the housing 15 directed downward (negative direction of Z axis in the drawing), and attached to the cylinder portion 25a using a screw (not shown). Power supply connectors 43a, 43b to be connected to the battery 9 which is an external power supply and a plurality of signal connectors 44a, 44b to be connected to the sensors 8 are provided on the end surface on the non-output side of the bottom portion 15b of the housing 15. Further, the filters 6a, 6b and the like which are large components are provided on the end surface on the non-output side of the bottom portion 15b of the housing 15. The power supply connectors 43a, 43b are connectors through which large current flows, and the signal connectors 44a, 44b are connectors through which smaller current flows as compared to current flowing through the power supply connectors 43a, 43b.

Inside the housing 15, a heatsink 41, the control boards 4a, 4b, power modules 50a, 50b including a plurality of switching elements forming the inverter circuits 3a, 3b (see FIG. 1), smoothing capacitors 30U, 30V, 30W (30aU, 30aV, 30aW, 30bU, 30bV, 30bW), and the like are provided. It is noted that the power module 50a corresponds to the inverter circuit 3a and the power module 50b corresponds to the inverter circuit 3b.

The heatsink 41 is made of metal which is highly heat-conductive material such as aluminum or copper, and includes a base portion 41a having a disk shape and a pillar portion 41b having a rectangular parallelepiped shape and erected at the center part of the base portion 41a. The base portion 41a of the heatsink 41 is placed in the opening on the non-output side of the cylinder portion 25a. The base portion 41a is pressed and held between the frame 29 and the circumferential wall 15a of the housing 15 attached to the cylinder portion 25a. Thus, the heatsink 41 is fixed to the motor 2. The base portion 41a is in contact with the inner circumferential wall surface of the cylinder portion 25a, and is in contact with the end surface on the non-output side of the frame 29. The pillar portion 41b is placed in the housing 15 so as to be located on the extension line of the axis of the output shaft 21. The pillar portion 41b has four placement portions 41d, 41e, 41f, 41g (see FIG. 3) formed to be flat surfaces parallel to the axial direction (Z-axis direction) of the output shaft 21.

A recess 41c is formed so as to open to the lower side of the base portion 41a and the base portion 41a side of the pillar portion 41b. The protruding end of the output shaft 21 from the frame 29, i.e., the non-output-side end of the output shaft 21 is inserted into the recess 41c and is located in the base portion 41a. The sensor rotor 18 is mounted to the non-output-side end of the output shaft 21. The sensor rotor 18 is formed of one pair or plural pairs of magnet rotors. A circuit board 40 is provided at an opposed surface of the sensor rotor 18 in the recess 41c. The rotation sensors 17a, 17b are mounted on the circuit board 40 so as to be opposed to the sensor rotor 18. Each of the rotation sensors 17a, 17b independently detects change in the magnetic field due to rotation of the sensor rotor 18. Thus, each rotation sensor 17a, 17b independently detects rotation of the output shaft 21. The rotation sensors 17a, 17b are included in one package. However, each rotation sensor 17a, 17b may be individually formed in one package.

The power supply lines and signal lines of the rotation sensors 17a, 17b are separately led to the left and right sides (positive and negative directions of X axis) in FIG. 2 via a wiring pattern of the circuit board 40, so as to be connected to the lower sides of the control boards 4a, 4b. The sensor rotor 18 and the rotation sensors 17a, 17b are described as a magnetic sensor type. However, they are not limited to this type, and may be resolvers or Hall sensors.

As shown in FIG. 3, the power modules 50a, 50b are formed such that the plurality of switching elements forming the inverter circuits 3a, 3b (see FIG. 1) mounted on base wires are sealed with resin. The power modules 50a, 50b are respectively attached in close contact with one pair of the opposed placement portions 41f, 41g of the heatsink pillar portion 41b (see FIG. 2).

In FIG. 3, the control board 4a is formed in a rectangular flat plate shape, to which the CPU 10a, the drive circuit 11a, the input circuit 12a, a power supply circuit 13a, and the like described in FIG. 1 are mounted. Similarly, the control board 4b is formed in a rectangular flat plate shape, to which the CPU 10b, a drive circuit 11b, the input circuit 12b, a power supply circuit 13b, and the like are mounted. The control boards 4a, 4b are attached in parallel to another pair of the opposed placement portions 41d, 41e of the pillar portion 41b, so as to be spaced therefrom. The control board 4a is connected to a signal line 50c of the power module 50a. Therefore, the control board 4a is located at the placement portion 41d so as to protrude toward the power module 50a side from the placement portion 41d. Thus, the control board 4a and the power module 50a overlap each other as seen in the direction perpendicular to the placement portion 41d. Similarly, the control board 4b is connected to a signal line 50d of the power module 50b. Therefore, the control board 4b is located at the placement portion 41e so as to protrude toward the power module 50b side from the placement portion 41e. Thus, the control board 4b and the power module 50b overlap each other as seen in the direction perpendicular to the placement portion 41e.

In FIG. 2, a signal line 44c of the signal connector 44a is led through the bottom portion 15b into the housing 15, so as to be connected to the upper side of the control board 4a near the signal connector 44a. On the other hand, a signal line 44d of the signal connector 44b is also led through the bottom portion 15b into the housing 15, so as to be connected to the upper side of the control board 4b near the signal connector 44b. Thus, the signal lines 44c, 44d are connected to the input circuits 12a, 12b (see FIG. 1) of the control boards 4a, 4b.

In FIG. 2, a power supply line 43c of the power supply connector 43a is led via the filter 6a from the bottom portion 15b into the housing 15. The power supply line 43c led into the housing 15 is connected to a power supply line (not shown) of the power supply relay 5a or the inverter circuit 3a via a bus bar of a relay member 42. On the other hand, a power supply line 43d of the power supply connector 43b is also led via the filter 6b from the bottom portion 15b into the housing 15. The power supply line 43d led into the housing 15 is connected to a power supply line (not shown) of the power supply relay 5b or the inverter circuit 3b via a bus bar of the relay member 42.

As shown in FIG. 3, an output terminal 51a of the inverter circuit 3a is led from the power module 50a toward the control board 4b side. The output terminal 51a is connected to an extension terminal 42a via a bus bar of the relay member 42. The extension terminal 42a passes on the motor 2 side of the control board 4b, to be led outward in the radial direction. On the other hand, an output terminal 51b of the inverter circuit 3b is also led from the power module 50b toward the control board 4a side. The output terminal 51b is connected to an extension terminal 42b via a bus bar of the relay member 42. The extension terminal 42b passes on the motor 2 side of the control board 4a, to be led outward in the radial direction.

The phase terminals 28a (28aU, 28aV, 28aW) connected to the windings for the respective phases of the motor winding 24a penetrate through the frame 29 and the base portion 41a, to be led into the housing 15. The phase terminals 28a (28aU, 28aV, 28aW) are connected to the respective extension terminals 42a on the motor 2 side of the control board 4b at the radially outer side. On the other hand, the phase terminals 28b (28bU, 28bV, 28bW) connected to the windings for the respective phases of the motor winding 24b penetrate through the frame 29 and the base portion 41a, to be led into the housing 15. The phase terminals 28b (28bU, 28bV, 28bW) are connected to the respective extension terminals 42b on the motor 2 side of the control board 4a at the radially outer side.

In FIG. 2, the smoothing capacitors 30aU, 30aV, 30aW are fixed to a support member 45a, and are arranged in a vertically stacked manner on the radially outer side of the control board 4b. That is, the smoothing capacitors 30aU, 30aV, 30aW are arranged in one row along the axial direction (Z-axis direction) of the output shaft 21 such that their length directions are perpendicular to the axial direction of the output shaft 21 and parallel to the placement portion 41e (see FIG. 3). The smoothing capacitors 30aU, 30aV, 30aW are arranged so as to be close to the power supply connector 43a side as seen from the non-output side (positive direction of Z axis) in the axial direction of the output shaft 21. One set of the smoothing capacitors 30aU to 30aW are arranged on the radially outer side of the other control board 4b located at the opposite position far from the one control board 4a, and the one power module 50a and the other control board 4b are arranged therebetween.

The smoothing capacitors 30bU, 30bV, 30bW are also fixed to a support member 45b, and are arranged in a vertically stacked manner on the radially outer side of the control board 4a. That is, the smoothing capacitors 30bU, 30bV, 30bW are arranged in one row along the axial direction of the output shaft 21 such that their length directions are perpendicular to the axial direction of the output shaft 21 and parallel to the placement portion 41d (see FIG. 3). The smoothing capacitors 30bU, 30bV, 30bW are arranged so as to be close to the power supply connector 43b side as seen from the non-output side (positive direction of Z axis) in the axial direction of the output shaft 21. It is noted that terminals of the smoothing capacitors 30 are connected to power supply lines (not shown) of the relay member 42 or power supply lines (not shown) wired in the power modules 50a, 50b.

Noise occurring in the control unit 1 of the power steering device of embodiment 1 described above, and measures therefor, will be described.

Figure 4:
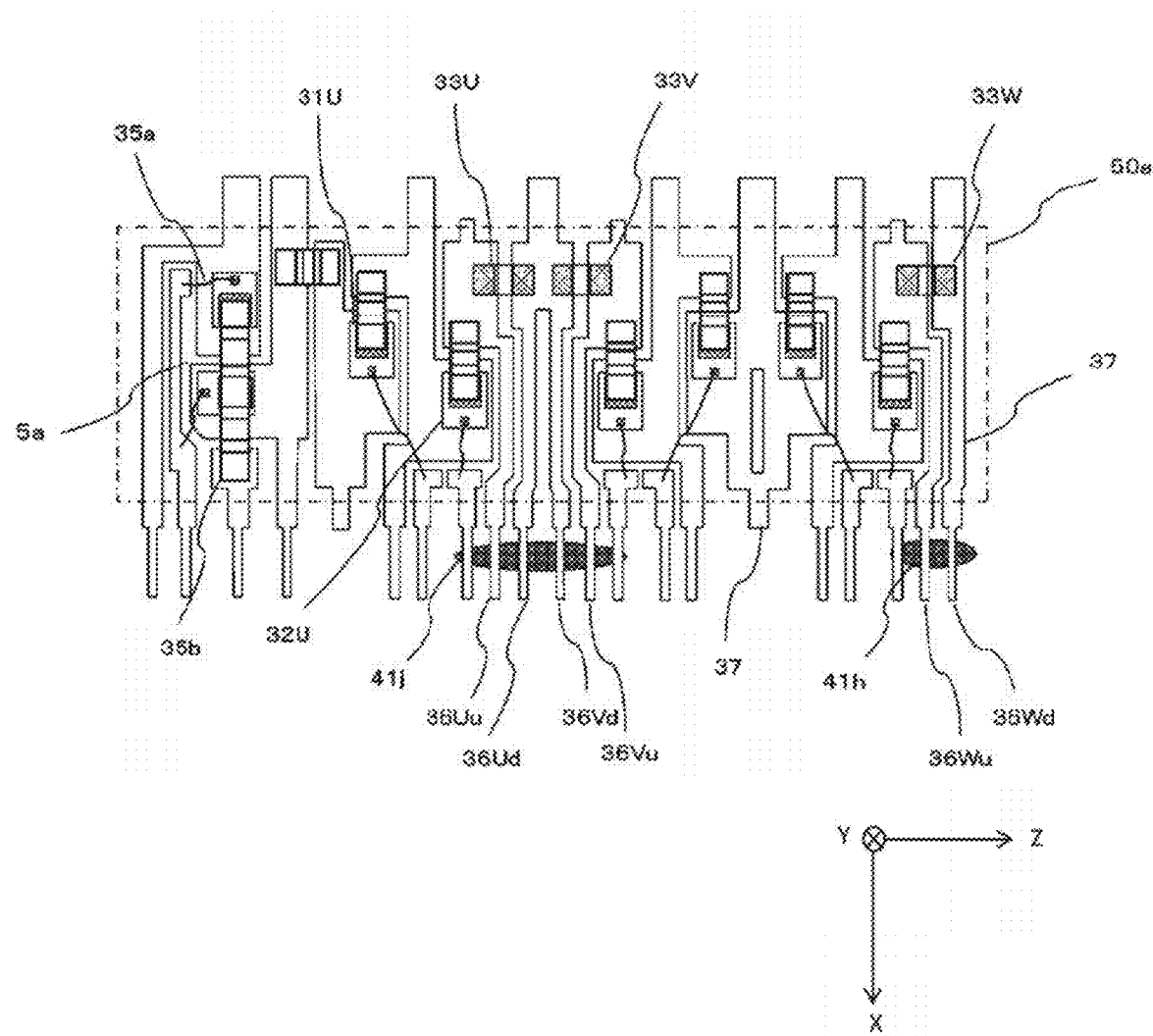
FIG. 4 is a see-through view of a power module of the electric power steering device according to embodiment 1.

FIG. 4 is a see-through view showing the internal structure of the power module 50a, in which the inverter circuit 3a and the power supply relay 5a shown in the circuit diagram in FIG. 1 are mounted. A dotted-dashed line represents the outer shape of molding resin. As main wires, base plates 37 are used, and multiple terminals extend from the base plates 37 in the up-down direction in the drawing. Control terminals for comparatively small current are arranged in a lower-side row, and power terminals for large current are arranged on the upper side. In FIG. 4, the power supply relay 5a is located at the left end of the power module 50a. The base of each FET is connected via a wire bond 35a, and a jumper wire 35b is provided to electrically connect between parts. Here, shunt resistors 33U, 33V, 33W for current detection are distributed and arranged around the upper side (negative side of X axis) in the drawing, and wires for voltage detection extend to the lower side (positive side of X axis).

That is, as with other control terminals, detection terminals 36Uu, 36Ud, 36Vu, 36Vd, 36Wu, 36Wd of the shunt resistors 33U, 33V, 33W are arranged two by two, six in total, on the lower side (positive side of X axis) in FIG. 4. Since currents flowing through these terminals are small, the shape and the material thereof are the same as those of the control terminals. Since six FETs are subjected to PWM driving near these terminals, a lot of noises are mixed into voltage detection at the moment when the FET is switched on/off. Regarding the above noises, since the CPU 10a outputs drive signals, it is possible to solve the noise mixing problem by monitoring the drive signals and detecting voltages while avoiding the moment of the switching. However, regarding switching in the power module 50b caused by drive signals from the other CPU 10b, the power module 50b is away from the detection terminals 36Uu, 36Ud, 36Vu, 36Vd, 36Wu, 36Wd, but noise might be mixed into the wires thereof. If the CPUs 10a, 10b are precisely synchronized with each other and have the same PWM cycle, mixing of noise can be prevented by precisely setting the detection time. However, the CPUs 10a, 10b are present independently of each other and make outputs independently, and therefore it is impossible that their drive signals are precisely matched with each other. If the CPUs 10a, 10b independently output drive signals without synchronization and the CPUs 10a, 10b do not detect each other, it is necessary to take noise removing measures for the detection terminals 36Uu, 36Ud, 36Vu, 36Vd, 36Wu, 36Wd.

Figure 5:
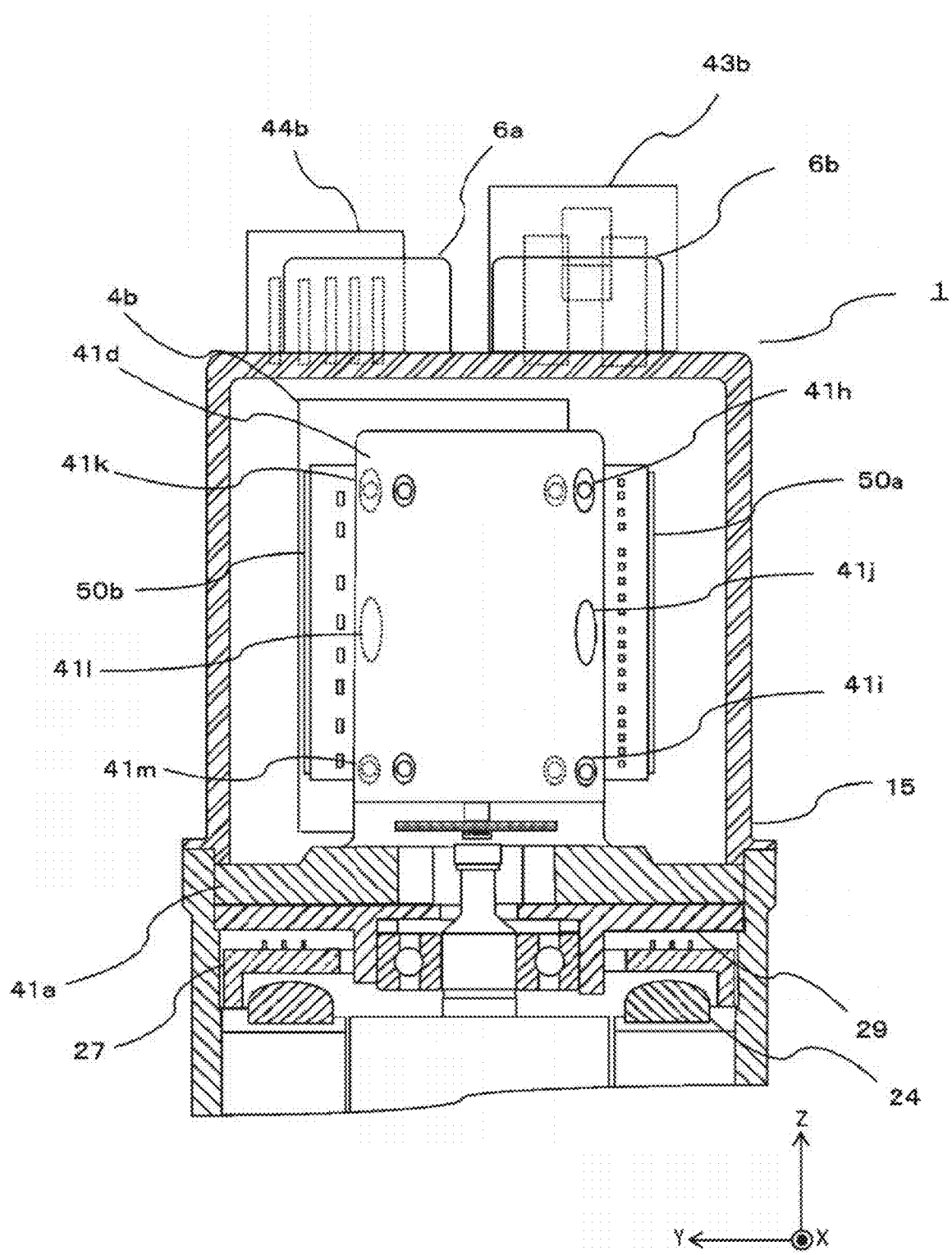
FIG. 5 is a partial sectional view around the control unit of the electric power steering device according to embodiment 1, as seen from one side.

To prevent mixing of noise, shield walls 41h, 41j are provided at parts indicated by ellipses in FIG. 4 near the six detection terminals 36Uu, 36Ud, 36Vu, 36Vd, 36Wu, 36Wd for voltage detection. The ranges of the shield walls 41h, 41j are set to be equal to or wider than the interval between the detection terminals so as to extend to adjacent other detection terminals, thereby also shielding noise passing around. The shield walls 41h, 41j will be further described with reference to FIG. 5. FIG. 5 is a partial sectional view as seen in the direction of arrow P in FIG. 3, i.e., as seen from the placement portion 41d which is a control board grounded surface of the heatsink 41, while the control board 4a and the like are not shown. The power modules 50a, 50b are placed on both sides of the heatsink 41, and a part of the other control board 4b is placed at the back of the power modules 50a, 50b. Shield walls 41h, 41j, 41i are provided on the placement portion 41d which is a control board grounded surface. The shield walls 41h, 41j, 41i protrude in the X-axis direction in FIG. 5. The shield walls 41h, 41i have holes to which screws 14c are screwed, and the shield wall 41j does not have such a hole. The shield wall 41h and the shield wall 41i are different in length in the Z direction in the drawing. It is noted that shield walls 41k, 41l, 41m represented by broken lines are provided on the control board 4b side.

The shield wall 41h provided near the detection terminals 36Wu, 36Wd of the power module 50a, shown in FIG. 4, is located at such a position as to be able to serve also for fixation of the control board 4a in FIG. 5. Thus, a support portion for fixing the control board 4a is formed to have a large sectional area so as to also serve as a shield wall, whereby the number of components is decreased.

Although the shield walls 41j, 41l are close to the control board 4a, the shield walls 41j, 41l may not necessarily be in contact with the control board 4a. If they are in contact with the control board 4a, components and wires other than ground patterns cannot be provided at the contact areas. Therefore, each shield wall 41j, 41l and the control board 4a may be slightly spaced from each other without contact therebetween so as not to reduce the effective area of the control board 4a. Regarding the shield walls 41i, 41m, there are no control terminals or detection terminals to be shielded, and thus the shield walls 41i, 41m need not have wide sectional areas. Therefore, their ellipse areas are set to be smaller as compared to the shield walls 41h, 41k.

Owing to these shield walls, in particular, radiation noise from switching noise in another power module can be suppressed. Thus, it becomes possible to accurately detect the current value which is the potential difference between both ends of the shunt resistor. In FIG. 3, radiation noises are schematically indicated by arrows 60a, 60b, and it is shown that switching noise is shielded by the shield walls 41h, 41k.

Embodiment 2

Next, a type different from embodiment 1 in the structure in the control unit will be described with reference to FIG. 6. A control unit 100 in FIG. 6 has a circuit configuration almost equal to that in FIG. 1, but is provided on the output-direction side of an output shaft 21a of the motor 2 (positive side of Z axis in the drawing). Therefore, the output shaft 21a penetrates through the center of the control unit 100. The structure of the motor 2 is equal to that in embodiment 1, that is, the rotor 23, the stator 22, the winding 24, and the like are stored in the motor case 25, an annular wiring portion 27a is provided on the upper side of the winding 24 in the drawing, and the phase terminals 28a, 28b of the windings extend toward the control unit 100.

Figure 6:
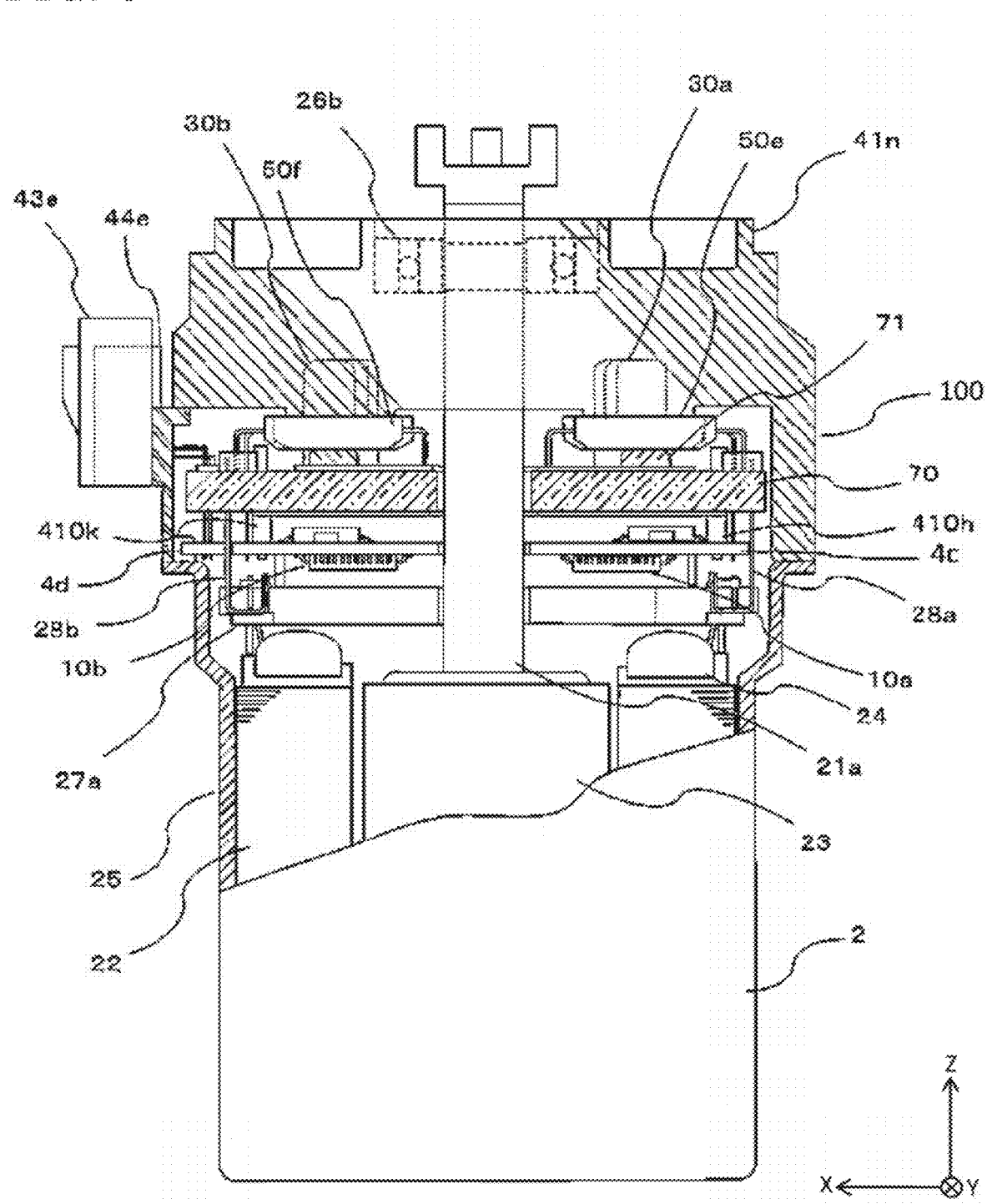
FIG. 6 is a sectional view showing an electric power steering device according to embodiment 2.

The control unit 100 has a structure in which, from the lower side (motor side) in FIG. 6, two control circuits 10a, 10b formed by one control board 4d, a relay member 70, power modules 50e, 50f, and a heatsink 41n are stacked in this order. The heatsink 41n serves as a connection part between a cover of the control unit 100 and, for example, a speed reduction mechanism on the vehicle side. Connectors 43e, 44e are provided on a side surface of the control unit 100. Instead of providing connectors one by one for each set as in embodiment 1, one connector 43e for power supply and one connector 44e for signal are provided and they are separated for each set inside. Capacitors 30a, 30b are present inside the heatsink 41n and therefore represented by broken lines.

The relay member 70 is made from an insulating resin material. The relay member 70 has electric wires, e.g., copper plates wired therein or on the upper/lower surface thereof, and at least has positive and negative power supply lines. The terminals of the capacitors 30a, 30b are connected to these power supply lines, and further, the power supply lines of the power modules 50e, 50f are also connected in the same manner. Projections 71 are provided for pressing the power modules 50e, 50f to the heatsink 41n.

Figure 7:
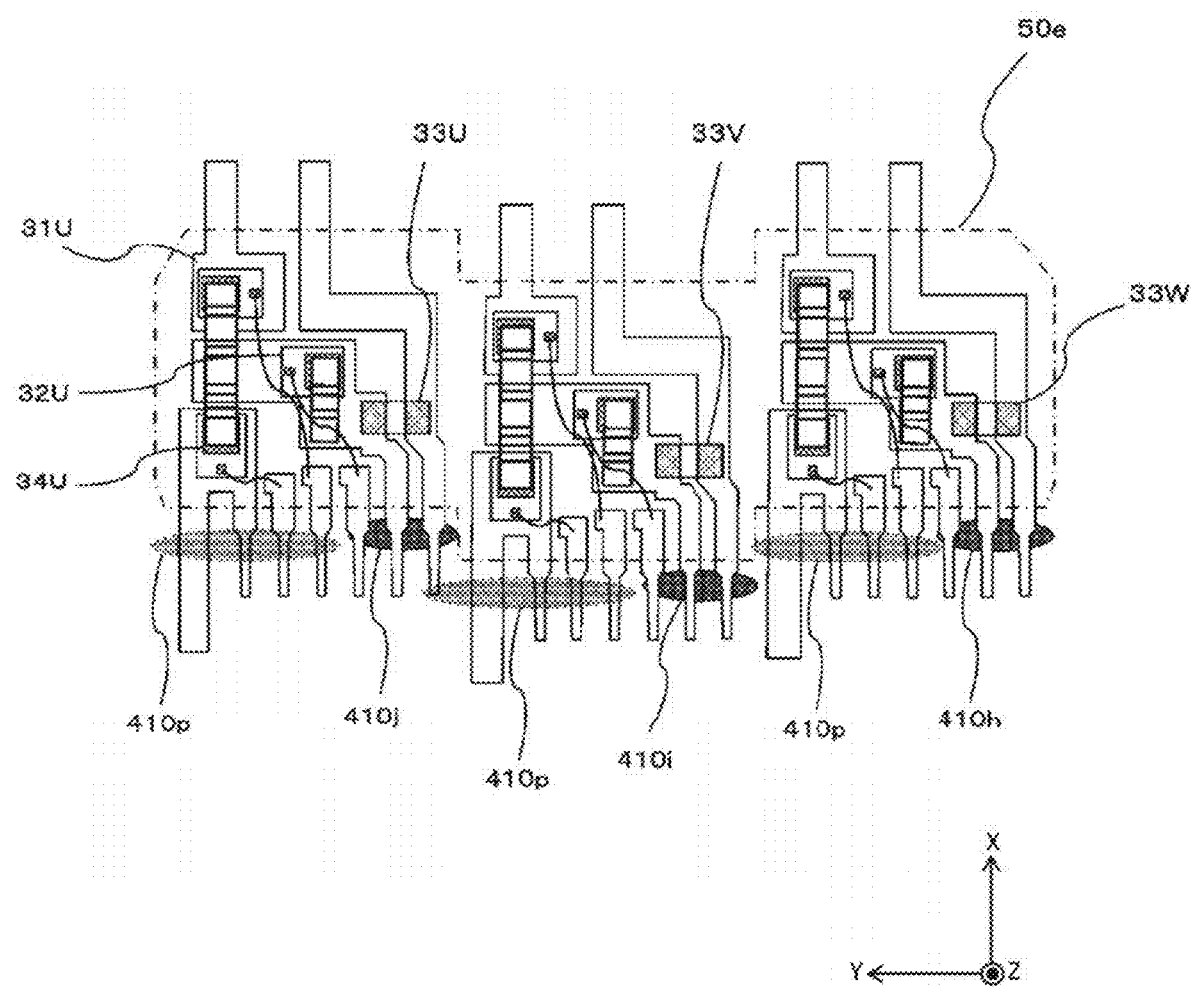
FIG. 7 is a see-through view of a power module of the electric power steering device according to embodiment 2.

FIG. 7 shows the outer shape and internal wires of the power module 50e. It is noted that the power module 50f has the same structure and therefore description thereof is omitted here. Unlike embodiment 1, the power terminals and the control terminals are not completely separated from each other. In addition, the inverter circuit formed by the power module 50e additionally has a switching element 34U formed of a field effect transistor (FET), which is not provided in FIG. 1. The switching element 34U is an FET having a relay function and provided between the winding of the motor 2 and the connection point between the switching elements 31U, 32U formed of FETs in the upper and lower arms, and is constantly ON (conductive) in a normal case. In an abnormal case such as short-circuit fault of the FET, short-circuit of the motor windings, or ground fault, the switching element 34U is turned off to break the circuit, thereby suppressing influence on the other phases of the phases U, V, W. The power supply relays 5a, 5b shown in FIG. 1 are not provided.

The control terminals and the output terminals to the motor are arranged on the lower side (negative side of X axis) in FIG. 7, and the positive and negative power supply terminals are arranged on the upper side (positive side of X axis). Since the motor output terminals are connected to the phase terminals 28a of the motor windings, the motor output terminals are spaced from the control terminals by being arranged so as to be shifted in the radial direction (Y-axis direction) of the output shaft 21a as shown in FIG. 6.

The shunt resistors 33U, 33V, 33W and detection terminals at both ends thereof extend in the negative direction of X axis in FIG. 7, as with other control terminals as in embodiment 1. Therefore, shield walls are provided near the detection terminals at both ends of these shunt resistors, thereby shielding noise from the other power module 50f. Here, the shield walls are provided at three parts 410h, 410i, 410j. Since the control unit 100 is placed in a circular space as shown in FIG. 8A described later, the power modules 50e, 50f are configured with stages shifted among the phases.

Figure 8A:
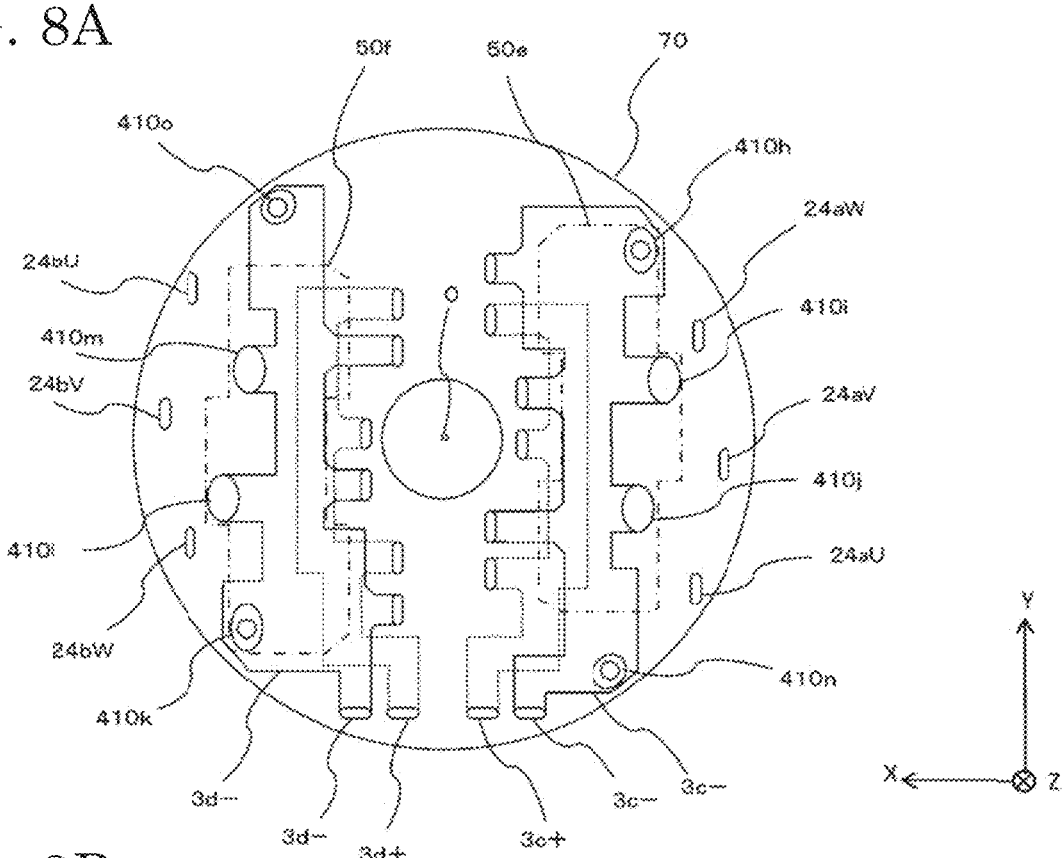
FIG. 8A is a plan view of a relay member of the electric power steering device according to embodiment 2 as seen from the control board side.
Figure 8B:
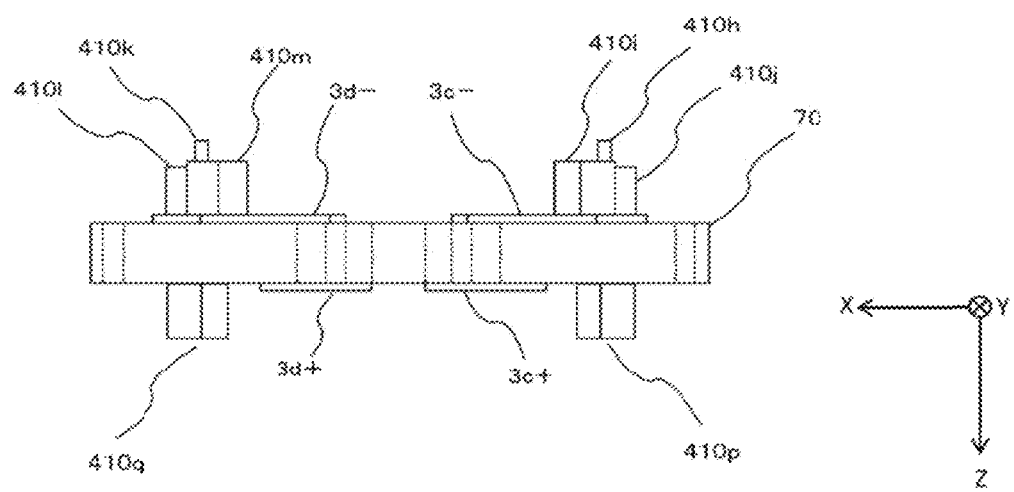
FIG. 8B is a front view thereof.

FIG. 8A is a plan view of the relay member 70 as seen from a control board 4c side, and FIG. 8B is a front view thereof. The power modules 50e, 50f for the respective sets, connection wires to the control boards and the like, and multiple elliptic holes are formed point-symmetrically between left and right in a substantially circular insulating member. Six holes 24aU, 24aV, 24aW, 24bU, 24bV, 24bW for connection to the windings of the motor are formed at the left and right ends (in X-axis direction) in FIG. 8A. Near these holes, the power modules 50e, 50f represented by broken lines are provided.

Elliptic holes for the positive and negative power supply terminals for the power modules 50e, 50f are formed as a pair, near an output shaft hole 0 at the center. Terminal holes 3c+, 3c−, 3d+, 3d− for power supply are formed at the lower part (Z-axis direction) in FIG. 8A, and from these holes, wires are led to the power supply terminals for the power modules. In FIG. 8B, the negative surface (ground pattern, 3c, 3d) is located at the upper surface on one side (surface on negative side of Z axis) of the relay member 70, and the positive surface (power supply pattern) is located at the lower surface on the other side (surface on positive side of Z axis, represented by broken lines in FIG. 8A). The ground patterns 3c−, 3d− are formed of copper plates, and electrically connected to shield walls 410h to 410m. The shield walls 410h to 410m are formed by pillars made of metal such as copper or aluminum. The shield walls 410i, 410j, 410l, 410m have no protrusions and are slightly spaced from the control board 4c without contact therewith. On the other hand, the shield walls 410h, 410k have protrusions at their ends, for fixing the control boards 4c, 4d. By these protrusions, the control board 4c is fixed and supported. It is noted that parts 410n, 410o have the same shape and material as the shield walls, but are not intended for shielding and are merely pillars for supporting the control board 4d.

As described above, the shield walls made of metal and connected to electric wires are provided near the detection terminals of each power module on the relay member 70 made of an insulating material, whereby mixing of noise from the other power module is prevented, and some of the shield walls are shared for supporting other components, to decrease the number of components. For mounting the shield walls to the relay member, various methods such as outsert, insert, and fitting may be adopted.

In addition, shield walls 410p, 410q are also provided on the lower side (positive side of Z axis) in FIG. 8B, i.e., the power module side. As with the shield walls 410h to 410m on the control board 4d side, the shield walls 410p, 410q are provided also on the power module 50e, 50f side so as to surround the vicinity of a radiation noise generation source. In view of placements of the power modules 50e, 50f and dispersion of radiation noise, the shield walls need to be as wide as possible in the width (length) direction. In particular, shield walls need to be provided around the terminals for the windings of the motor. The shield walls 410p, 410q are represented by broken lines in FIG. 7. High-frequency electromagnetic noise is contained even in radiation noise from the power module 50e, in particular, noise at the time of turning on/off the switching element. Therefore, the shield walls 410p, 410q exhibit a shielding effect even if the shield walls 410p, 410q are not electrically connected to the ground or the positive power supply line.

In the above description, the detection circuit is configured to detect voltage at both ends of the shunt resistor inside the power module. However, without limitation to the shunt resistor, for example, detection circuits for sensors such as the rotation sensor and the torque sensor in FIG. 1 are also applicable, depending on their arrangements. In addition, a type in which the circuit for amplifying the potential difference between both ends of the shunt resistor is also included in the power module, is also applicable. That is, shield walls made of metal are provided for detection terminals at positions opposed to a noise source, whereby radiation noise is suppressed, and some of the shield walls are shared as supports for components, whereby the number of components can be decreased. Further, whether or not to electrically connect the metal shield walls to the positive power supply or the ground may be determined on the basis of the type of radiation noise.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 1a, 1b, 100 control unit
2 motor 3a, 3b inverter circuit
4a, 4b, 4c, 4d control board
15 housing
21 output shaft
22 stator
23 rotor
24, 24a, 24b motor winding
25 motor case
28a, 28b phase terminal
31U, 32U, 34U switching element
33U, 33V, 33W shunt resistor
36Uu, 36Ud, 36Vu, 36Vd, 36Wu, 36Wd detection terminal
41, 41n heatsink
41h, 41i, 41j, 41k, 41l, 41m, 410h, 410i, 410j, 410k, 410l, 410m shield wall
50a, 50b, 50e, 50f power module
42, 70 relay member

The invention claimed is:

1. An electric power steering device comprising:
a motor having two sets of windings provided independently of each other; and
a control unit comprising:
two inverter circuits respectively supplying currents to the two sets of windings and each composed of a plurality of switching elements, and
two control circuits respectively connected to the two inverter circuits,
wherein the control unit further comprises:
a detection circuit for detecting current of each inverter circuit of the two inverter circuits, and a plurality of detection terminals for the two sets of windings of the motor, the plurality of detection terminals extending from the detection circuit, wherein the plurality of detection terminals comprises a pair of adjacent detection terminals, and
one or more shield walls, the one or more shield walls comprising a first shield wall,
wherein the first shield wall is made of metal, the first shield wall is configured to shield noise emitted by driving of one of the two inverter circuits, and the first shield wall is provided near the pair of adjacent detection terminals of an other one of the two inverter circuits, and
the first shield wall has a support member for supporting a first control circuit of the two control circuits,
wherein the first shield wall is configured to shield the pair of adjacent detection terminals, wherein the pair of adjacent detection terminals are used by the detection circuit for detection of a first current flowing through a shunt resistor.

2. The electric power steering device according to claim 1, wherein
each inverter circuit is a power module including the plurality of switching elements,
the detection circuit comprises the shunt resistor, and
the pair of adjacent detection terminals are extended for detecting voltage between both ends of the shunt resistor.

3. The electric power steering device according to claim 2, wherein
the first control circuit and the power module have a plurality of control terminals electrically connected respectively,
the plurality of detection terminals are arranged together with the plurality of control terminals, and
the first shield wall is provided near the pair of adjacent detection terminals on a side of the power module that is connected to the first control circuit, so as to extend across to a control terminal adjacent to the pair of adjacent detection terminals.

4. The electric power steering device according to claim 1, wherein in the control unit, the two control circuits and the two inverter circuits are provided to respective four sides of a heatsink, and the one or more shield walls protrude from the heatsink toward the two control circuits.

5. The electric power steering device according to claim 4, wherein
the control unit is provided coaxially with an output shaft of the motor, and in a direction opposite to an output direction of the output shaft.

6. The electric power steering device according to claim 1, wherein
in the control unit, the two control circuits, a relay member, the two inverter circuits, and a heatsink are stacked in this order,
the relay member is provided with at least a ground pattern, and
the one or more shield walls are provided so as to be electrically connected to the ground pattern.

7. The electric power steering device according to claim 6, wherein
the control unit is provided coaxially with an output shaft of the motor in an output direction of the output shaft, the relay member being configured with a shaft hole approximately in a center of the control unit, and the output shaft configured to penetrate through the shaft hole.

8. The electric power steering device according to claim 1, the two control circuits comprising respectively a first control board and a second control board, the first control board extending in a Y direction and a Z direction, the first shield wall protruding in an X direction, wherein the X direction, the Y direction and the Z direction form orthogonal coordinate axes, the first shield wall having an elliptical shape when viewed in the X direction, and an output shaft of the motor extends in the Z direction.

* * * * *